United States Patent [19]

Rapp

[11] Patent Number: 4,720,907
[45] Date of Patent: Jan. 26, 1988

[54] IDENTIFICATION SYSTEM

[75] Inventor: Werner Rapp, Geislingen, Fed. Rep. of Germany

[73] Assignee: Euchner & Co., Fed. Rep. of Germany

[21] Appl. No.: 935,392

[22] Filed: Nov. 26, 1986

[30] Foreign Application Priority Data

Nov. 26, 1985 [DE] Fed. Rep. of Germany ....... 3541676

[51] Int. Cl.⁴ .............................................. G09F 11/02
[52] U.S. Cl. ................................... 29/568; 40/628; 40/630; 40/913; 279/1 TS; 408/16; 409/234
[58] Field of Search .................................. 40/628–630, 40/913; 409/80, 234; 279/1 TS; 29/568; 408/16, 116; 283/74, 79, 83

[56] References Cited

U.S. PATENT DOCUMENTS

| 1,984,839 | 12/1934 | Murray | 40/913 X |
| 3,128,645 | 4/1964 | Anthony | 40/913 X |
| 3,251,150 | 5/1966 | Sedgwick et al. | 40/913 X |
| 4,588,339 | 5/1986 | Bilz | 40/913 X |
| 4,620,362 | 11/1986 | Reynolds | 29/568 |

FOREIGN PATENT DOCUMENTS

| 1187585 | 5/1985 | Canada | 40/628 |
| 0111693 | 6/1984 | European Pat. Off. | |
| 2042982 | 3/1972 | Fed. Rep. of Germany | |
| 2739967 | 3/1979 | Fed. Rep. of Germany | |
| 3128980 | 4/1982 | Fed. Rep. of Germany | |
| 47134 | 3/1984 | Japan | 29/568 |

Primary Examiner—Gil Weidenfeld
Assistant Examiner—Steven C. Bishop
Attorney, Agent, or Firm—Wigman & Cohen

[57] ABSTRACT

A system for marking and identifying objects, particularly work implements such as tools and work piece holders required in manufacturing processes, which has modules (4) with electronically readable markings, which modules (4) are to be arranged on the objects (1) to be marked, as well as an evaluating device having at least one pick-up capable of reading the markings. Each module contains at least one oscillating circuit (5, 6, 7) to produce a characteristic resonant frequency or resonant frequency combination. The number of different resonant frequencies or resonant frequency combinations provided corresponds to the number of different elements in the selected characterizing code, and the resonant frequency or resonant frequency combination of each module (4) is selected according to one of these frequencies or frequency combinations. The modules (4), which are to be fixed to the object (1), are selected and arranged according to the elements necessary for the representation of the marking of the object (1) in the selected code.

23 Claims, 5 Drawing Figures

IDENTIFICATION SYSTEM

BACKGROUND OF THE INVENTION

The invention relates to a system for the marking and identification of objects, particularly work implements such as tools and work piece holders required in manufacturing processes, having modules with an electronically readable marking which are to be arranged on the objects to be marked, and having a testing device with at least one pick-up capable of reading the marking, whereby each module contains at least one oscillating circuit to produce a distinguishing resonance frequency or combination of resonance frequencies.

In known systems developed for marking tools and palettes in fully automatic manufacturing systems, the modules contain a memory, which either is already programmed or can be programmed by the user, such as a common commercial EPROM in which the marking is represented by a selected code. In addition, the module includes contacts which must be engaged by counter-contacts to pick-up and read the marking stored in the memory. When little space is available to house the module, as is often the case with tools, the only option available for receiving the module is a recess in the shaft. Under these circumstances modules are expensive. In addition, establishing the connection between the module and the pick-up is difficult and inhibits work speed and operational reliability. Also, when programmed by the user these modules demand corresponding skills and devices which are often not available and often leave the solution of the module programmed by the manufacturer as the only remaining option. This procedure is expensive and can lead to incorrect markings as a result of the danger of confusion.

It is also known in identifying mobile work piece holders to provide each work piece holder with a module containing one or more electrical oscillating circuits. This module differs from common modules in its resonant frequency or resonant frequency combination. The work piece holders can thus be identified when its module is passed by stationary sensors which detect the resonant frequency or resonant frequency combination. When there is a relatively large number of different objects to be marked, this kind of identification system requires a large expense. In addition, the danger of incorrect correlations in equipping the objects with the different modules is great.

OBJECTS AND SUMMARY OF THE INVENTION

Accordingly, one object of the present invention is to provide a system of the above-described type which not only has a small space requirement so that it can be used on tools without difficulty, but is also economical, not susceptible to malfunction and does not require special skills to employ it. This object is achieved by a system having (a) ten groups of modules of various resonant frequency or resonant frequency combination are provided, whereby each of these groups is associated with one of the numerals 0 through 9, (b) the modules to be fixed to the object are selected and arranged according to the numeral selected for the marking of the object, and (c) the surface of each module is provided with a numeral which anyone can read in the form of the numeral represented thereby.

By means of the fact that only ten different modules are required associated with the numerals 0–9, the expense for manufacturing as well as storage is reduced significantly. In addition, mistakes in the correlation of modules to objects is practically entirely eliminated because the marking of modules by means of an associated numeral eliminates confusion and an optical control can be instituted at any time after placement of the numeral on the object. The marking of an object is provided by modules according to the invention in such a way that at the object those modules are fixed in an array by a selected code, the resonant frequency or frequency combination of which has the meaning of the code elements of the marking. If a number with three figures in the decimal system is marked, modules are elected and fixed in the correct array at the object which correspond to the necessary figures of said number. In that case, modules with ten different resonant frequencies or resonant frequency combinations are required which are associated to the numerals 0 to 9. Accordingly, each code realizable with these numerals may be elected. For an identification of the object, i.e., for reading the code, it is only necessary to find out the frequency or frequency combination represented by each module by a serial or parallel sampling, i.e., by means of the pick-up of an oscillating electromagnetic field which does or does not cause the oscillating circuit of the module to oscillate. By means of this reaction the resonant frequency or resonant frequency combination of the module can be recognized as a basis for identifying the object.

Particularly in cases where the modules according to the invention form only a single oscillating circuit and therefore need only consist of one spool and one condenser, the modules can easily be manufactured with sufficiently small dimensions that the space requirement is small, even when the marking must be formed from a plurality of modules. Because both spools and condensers are inexpensive items and other elements including plug contacts and a battery are unnecessary, the modules are inexpensive and reliable. Furthermore, the user requires no special skills, because he need only select the modules according to their meaning, e.g. according to their numerical value in the decimal system, and arrange them in the correct positions. This last arrangement step is easily facilitated by providing each module with a symbol indicating its meaning, such as the numeral it represents.

Fixing the modules to the object to be marked can, of course, be accomplished in any suitable manner. However, a support having depressions, and preferably bores, is advantageous, and can also be a part of the object. Accordingly, one need only provide the shaft of a tool with a blind bore running in a lateral direction relative to the shaft, in order to easily place the modules required for the marking. Fixing the modules in the bores can also be accomplished in any desired manner such as with screws or glue. To the extent permitted by available space and to the extent that the material of which the support is made is magnetically conductive, one can also, for example, equip each module with a permanent magnet holding it to the support.

In one preferred embodiment the modules have the form of sections of a straight bar. They can then easily be placed in bores or bore-like depressions. It is similarly advantageous for all of the modules to have the same shape and size, because then the depressions can also be formed identically.

With a view toward providing the modules with the smallest possible spacial requirements, it is advantageous for them to include a cylindrical spool core with a concentric circular groove in one frontal surface to receive the winding. To complete the oscillating circuit then, only a condenser is necessary, which is connected to the spool.

To facilitate the handling of the modules, to protect them and to provide the simplest possible attachment thereof to the support, the modules can each have a housing which can also cover the frontal surfaces of the module.

The production of the electromagnetic oscillating field to activate the oscillating circuit of the interrogated module, and the recognition of the oscillation of this oscillating circuit can be accomplished by means of various spools in the pick-up, whereby several modules can be interrogated successively or simultaneously by means of respective activating and interrogating devices. However, one can also, with only a single spool in the pick-up, first produce the field that activates the module and then switch this spool over from a frequency generator to an evaluating circuit which evaluates the voltage induced in the spool in consequence of the oscillation of the oscillating circuit in the module.

For the interrogation of the modules, the frequency generator can be formed in such a manner that it successively generates those frequencies built into the various modules as resonant frequencies. However, the frequency generator can also be formed in such a manner that it continuously varies the frequency over the entire range in which the resonant frequencies of the modules lie. In both cases, further frequency variation can be prevented after the resonant frequency is reached. However, one can also generate an impulse containing all of the resonant frequencies of the module. In this instance, however, in evaluating the signals induced by the module, the frequency determination must be performed for identification, which can easily be accomplished with known electronic means.

BRIEF DESCRIPTION OF THE DRAWINGS

Two exemplary embodiments illustrated in the drawings are described in greater detail below. Shown are.

DETAILED DESCRIPTION OF THE PREFERRED EMBODIMENTS

Figure 1:
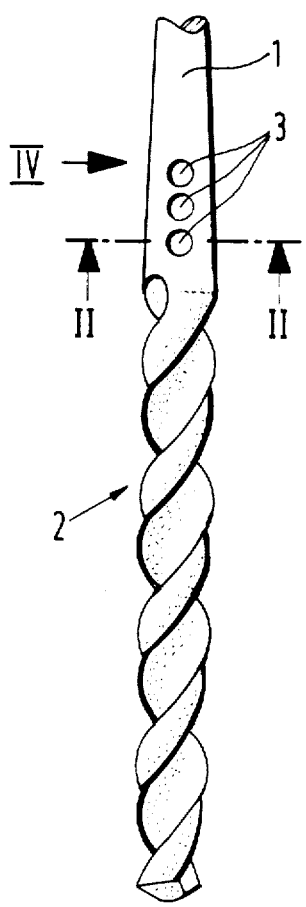
FIG. 1 is a view of a drill bit with a three-position marking in the shaft provided by a first embodiment of the module according to the invention.
Figure 2:
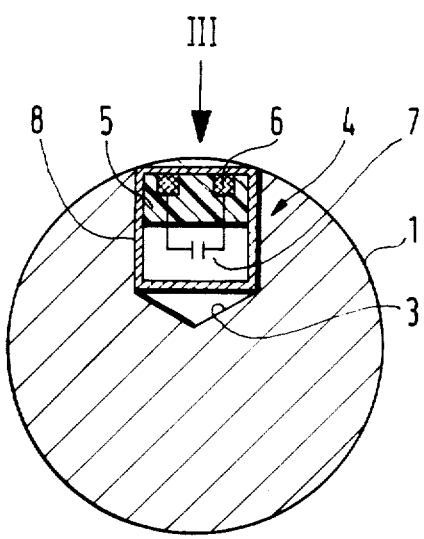
FIG. 2 is an enlarged sectional view along the line II—II in FIG. 1.
Figure 3:
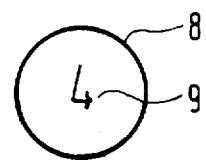
FIG. 3 is a frontal view of the module.

The shaft 1 of a tool, which in one exemplary embodiment is a drill bit 2, is provided with three blind bores 3, which are spaced from each other along the longitudinal dimension of the shaft and penetrate radially into the shaft 1. These bores 3 serve to receive respective modules, which are designated generally by the reference numeral 4. As shown in FIG. 2, each of the identically dimensioned modules 4 contains a cylindrical ferrite core 5, into one frontal surface of which there is formed a concentric circular groove. A spool 6 lies within this circular groove, and one winding end thereof leads to a condenser 7 and is connected therewith. This condenser 7 is arranged adjacent the ferrite core 5 on the side opposite the circular groove, as is indicated symbolically by the circuit diagram of the condenser 7.

Since in the exemplary embodiment the marking of the objects to be identified is to be accomplished by means of a three-digit numeral in the decimal system, the modules 4 form ten groups with different resonant frequencies which result from the use of condensers 7 of varying capacitance. The individual groups of modules 4 are thus associated with the numerals 0 through 9.

To protect the ferrite core 5, the spool 6 and the condenser 7, these elements are arranged in a cylindrical plastic housing 8, which is also closed on the frontal sides. The outside diameter and length of the housing 8 are adapted to the blind bores 3. One frontal side of the housing 8, preferably the side directed outward in the installed condition, bears as a marking symbol 9 the numeral that corresponds to the resonant frequency of this module 4.

If the drill bit 2, for example, is to be identified with the decimal number 430, then the modules 4 bearing the numerals 4, 3 and 0 as marking symbols are placed in the blind bores 3 in a corresponding order. A bit of glue holds the housing 8 in the completely inserted position illustrated in FIG. 2.

Figure 4:
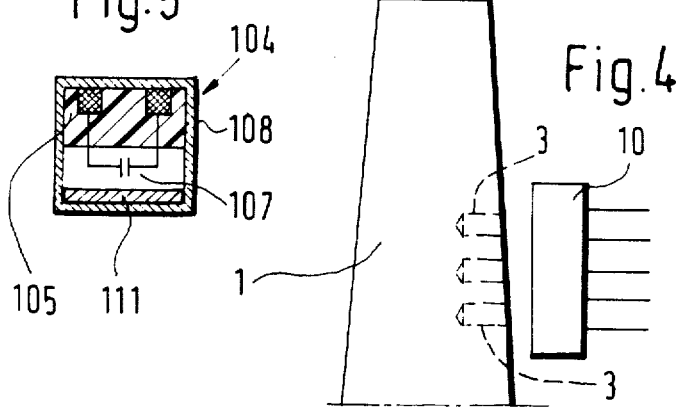
FIG. 4 is a partial schematic illustration of the shaft containing the modules and of the pick-up which makes possible the interrogation for purposes of identification.

In FIG. 4, the identification of the bore 3, is made using a pick-up 10 of an evaluating device aligned with the bores 3. Only those wires leading to the evaluating device are shown, and not the evaluating devices themselves, because these devices per se are known. The pick-up in the exemplary embodiment contains three spools which produce an electromagnetic oscillating field directed toward the associated module. If the pick-up 10 were to contain only one of these spools, then it would have to be directed toward the three modules 4 in succession. The pick-ups can be switched alternately to a frequency generator of the evaluating device and an evaluating circuit. For the interrogation of the module 4 the frequency generator first produces an impulse containing all ten different resonant frequencies. The electromagnetic alternating field of the three spools produced in this manner causes the oscillating circuits of the modules 4 to oscillate at their oscillating frequency. At the end of this impulse the three spools are automatically switched to respective frequency determining stages of the evaluating circuit. These frequency determining stages determine the frequency of the voltage produced in the associated spool on the basis of the oscillation of the connected oscillating circuit. On the basis of these frequencies the evaluating circuit recognizes the number forming the marking, i.e., the number 430 in the exemplary embodiment.

To the extent necessary to change the marking of the drill bit 2, the modules that are no longer to be used need only be replaced with others.

Figure 5:
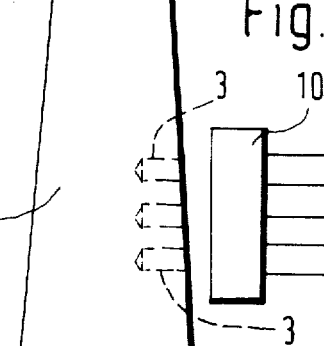
FIG. 5 is a longitudinal section of a modified module.

In FIG. 5 there is shown a modified module 104 which includes a permanent magnet 111 having the shape of a cylindrical disc like the ferrite core 105. For purposes of the invention the condenser 107 is arranged between the permanent magnet 111 and the ferrite core 105, which is formed in the same manner as the ferrite core 5, and the permanent magnet 111, like the other structural elements, lies inside the plastic housing 108.

The permanent magnet 111 holds the module 104 in its receiving bore, for example, so that other means for fixing the module in place are unnecessary.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. System for marking and identification of objects, particularly work implements such as tools and work piece supports required in manufacturing processes, having modules with an electronically readable marking, which modules are to be arranged on the objects to be marked, and an evaluating device with at least one pick-up capable of reading the marking, whereby each module contains at least one oscillating circuit to produce a characteristic resonant frequency or resonant frequency combination, comprising:
   (a) ten groups of modules of various resonant frequency or resonant frequency combination are provided, whereby each of these groups is associated with one of the numerals 0 through 9;
   (b) the modules to be fixed to the object are selected and arranged according to the numeral selected for the marking of the object; and
   (c) the surface of each module is provided with a numeral which anyone can read in the form of the numeral represented thereby which indicates the meaning of said module as a code element;
   wherein said objects to be marked are provided with a support with depressions, particularly bores, arranged in a row to receive the modules for marking.

2. System according to claim 1, further including a support with depressions, particularly bores, arranged in a row to receive the modules for marking.

3. System according to claim 2, wherein the support is formed by a portion of the object.

4. System according to claim 1, wherein the support is formed by a portion of the object.

5. System according to claim 1, wherein the modules have the form of sections of a straight bar.

6. System according to claim 5, wherein the modules have the same shape and same size.

7. System according to claim 1, wherein each module comprises a cylindrical spool core having a concentric circular groove in one frontal surface and a spool lying in this circular groove, and a condenser connected to this spool.

8. System according to claim 7, wherein the spool core forms one end section of the module and a permanent magnet forms the other.

9. System according to claim 8, wherein the modules have a housing which is adapted to the shape of the depressions.

10. System according to claim 7, wherein the support is formed by a portion of the object.

11. System according to claim 12, wherein the support is formed by a portion of the object.

12. System according to claim 9, wherein the support is formed by a portion of the object.

13. System according to claim 7, wherein the modules have the form of sections of a straight bar.

14. System according to claim 8, wherein the modules have the form of sections of a straight bar.

15. System according to claim 9, wherein the modules have the form of sections of a straight bar.

16. System according to claim 7, wherein the modules have the same shape and same size.

17. System according to claim 8, wherein the modules have the same shape and same size.

18. System according to claim 9, wherein the modules have the same shape and same size.

19. System according to claim 1, wherein the pick-up contains at least one spool, which is connected alternately to a frequency generator and an evaluating circuit.

20. System according to claim 19, wherein the frequency generator produces a continuously changing frequency, a step-wise changing frequency or an impulse containing all of the resonant frequencies.

21. System according to claim 7, wherein the pick-up contains at least one spool, which is connected alternately to a frequency generator and an evaluating circuit.

22. System according to claim 8, wherein the pick-up contains at least one spool, which is connected alternately to a frequency generator and an evaluating circuit.

23. System according to claim 9, wherein the pick-up contains at least one spool, which is connected alternately to a frequency generator and an evaluating circuit.

* * * * *

UNITED STATES PATENT AND TRADEMARK OFFICE
CERTIFICATE OF CORRECTION

PATENT NO. : 4,720,907
DATED : January 26, 1988
INVENTOR(S) : WERNER RAPP

It is certified that error appears in the above-identified patent and that said Letters Patent is hereby corrected as shown below:

IN THE CLAIMS:

Claim 11, line 1, "claim 12" should be --claim 8--.

Signed and Sealed this

Twenty-first Day of June, 1988

Attest:

DONALD J. QUIGG

Attesting Officer

Commissioner of Patents and Trademarks